B. F. Stewart.
Horse Hay Fork.
Nº 69857      Patented Oct. 15, 1867.
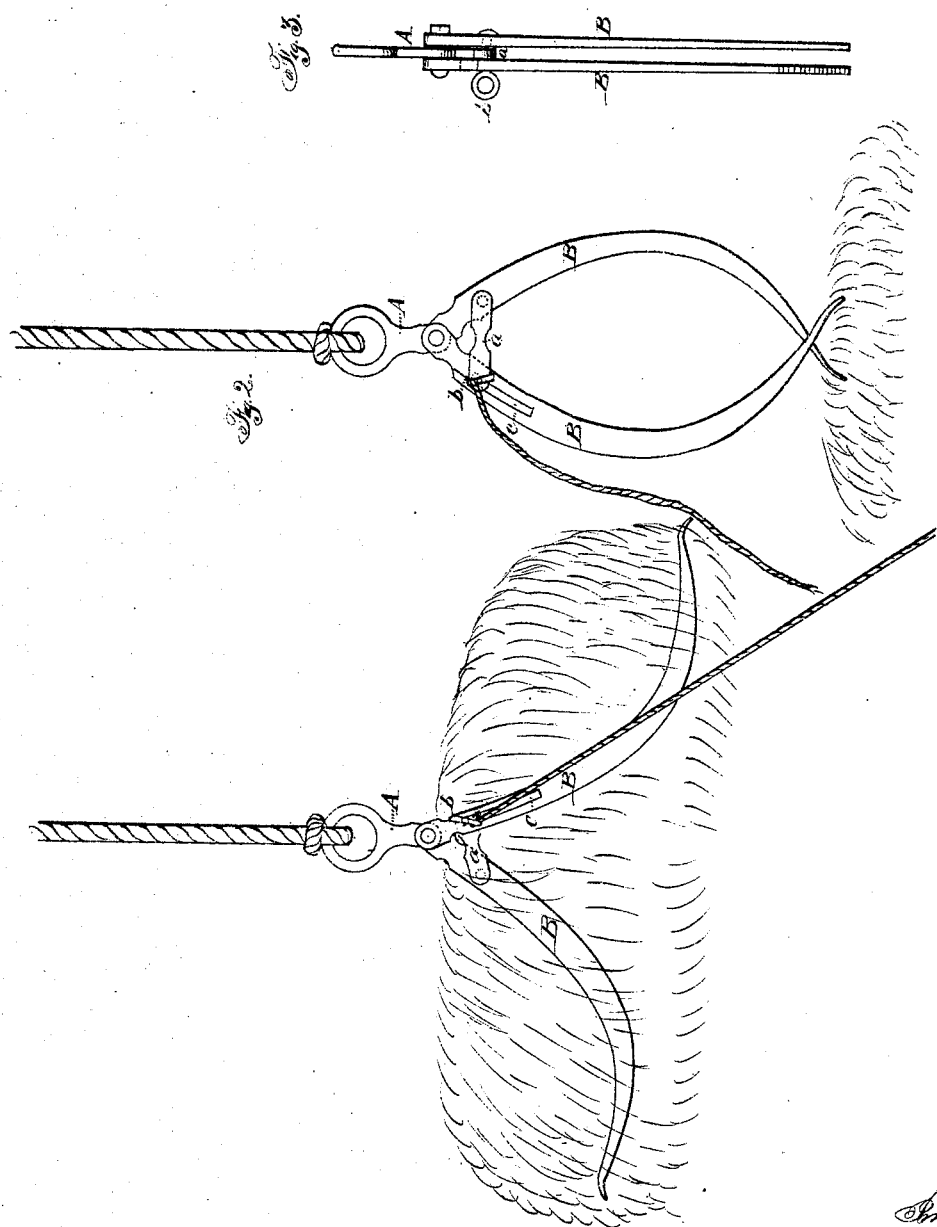
Witnesses
Theo Fusche
Wm Trewin
Inventor
B F Stewart
Per Munn & Co
Attorneys

United States Patent Office.

B. F. STEWART, OF FREEPORT, OHIO.

*Letters Patent No. 69,857, dated October 15, 1867.*

---

IMPROVEMENT IN HORSE HAY-FORKS.

---

*The Schedule referred to in these Letters Patent and making part of the same.*

---

TO ALL WHOM IT MAY CONCERN:

Be it known that I, B. F. STEWART, of Freeport, in the county of Harrison, and State of Ohio, have invented a new and useful Improvement in Hay-Forks; and I do hereby declare that the following is a full, clear, and exact description thereof, which will enable others skilled in the art to make and use the same, reference being had to the accompanying drawings, forming part of this specification, in which—

Figure 1 represents my improved hay-fork, when expanded to carry a bundle of hay.

Figure 2 represents the same when closed, ready to penetrate the hay, to rake up a load.

Figure 3 is a side or edge view of the same.

Similar letters of reference indicate like parts.

This invention relates to an improvement in the construction of hay-forks, and consists in attaching two curved tines or prongs to a handle by a pivot, on one of which prongs is pivoted a link, that is connected with the other prong by a wrist working in a slot, the parts being so arranged and operated that when the prongs are closed, they can be pushed into the hay, opening, as they penetrate into it, until they are fully expanded to take up a load, which, upon being lifted by the handle, and deposited in place, in the usual way, is released from the fork by drawing with a hand-rope upon the link that connects the prongs, in order to close them again. The operation of loading hay with this fork is simple, easy, and expeditious.

A is the handle, provided with a ring for hoisting by, in the ordinary manner, on each side of which handle is pivoted a flat, curved prong, B, with the points bent a little reversely, as shown in the drawings, to facilitate penetration into the hay. A short, flat link or connecting-bar, $a$, is pivoted at one end to the inner side of one of the prongs, and is connected with the other prong by the wrist of a ring, $b$, made fast to the other end, which ring passes through a slot, $c$, in the other prong, to connect and hold the prongs together for operating. The link $a$ is made flat, of the same thickness as the handle A, so that it lies between the two flat inner sides of the prongs, and serves as a brace or latch, and keeps them apart, evenly and steadily, as they are opened and closed; and the link is made long enough in its connection with the prongs to allow them to open wide, with their concave sides outwards, as shown in fig. 1, and to close with their points nearly together, and their convex sides outwards, as shown in fig. 2. As the prongs are opened and closed, the connecting-link $a$ turns on its pivot at one end as a centre, and the ring $b$ traverses in the slot $c$, on the circumference of a circle, thus regulating the movement of the prongs perfectly.

A hoisting-rope is attached to the ring on the handle, and a hand-rope to the ring $b$ on the link-bar $a$, for closing the prongs and releasing the load of hay, when raised and deposited by the fork. The prongs are closed, in order to penetrate the hay by pushing on the handle, and they open as they are pressed into the hay, so as to take up a wide, flat bundle or flake-like parcel of hay, which will lie and pack more advantageously than a bunch.

Having described my invention, I claim as new, and desire to secure by Letters Patent—

The curved prongs B B, pivoted at one end to the handle A, and connected by the link $a$, pivoted at one end to one prong, and working at the other end in the other prong, constructed and operating substantially as and for the purpose herein described.

B. F. STEWART.

Witnesses:
 JONATHAN DICK,
 W. McMATH.